(12) United States Patent
Mendez Aguilera

(10) Patent No.: US 11,261,131 B2
(45) Date of Patent: Mar. 1, 2022

(54) MASONRY CONSTRUCTION MATERIAL WITH A CELLULOSE MATRIX AND METHOD FOR OBTAINING SAME

(71) Applicant: Luis Enrique Mendez Aguilera, Talcahuano (CL)

(72) Inventor: Luis Enrique Mendez Aguilera, Talcahuano (CL)

( * ) Notice: Subject to any disclaimer, the term of this patent is extended or adjusted under 35 U.S.C. 154(b) by 0 days.

(21) Appl. No.: 16/973,753

(22) PCT Filed: Jun. 20, 2019

(86) PCT No.: PCT/CL2019/050050
§ 371 (c)(1),
(2) Date: Dec. 9, 2020

(87) PCT Pub. No.: WO2019/241900
PCT Pub. Date: Dec. 26, 2019

(65) Prior Publication Data
US 2021/0253475 A1 Aug. 19, 2021

(51) Int. Cl.
| | | |
|---|---|---|
| *C04B 18/24* | (2006.01) | |
| *B28B 1/50* | (2006.01) | |
| *C04B 7/34* | (2006.01) | |
| *C04B 111/20* | (2006.01) | |
| *C04B 111/28* | (2006.01) | |
| *C04B 111/52* | (2006.01) | |

(52) U.S. Cl.
CPC ............ *C04B 18/24* (2013.01); *B28B 1/50* (2013.01); *C04B 7/34* (2013.01); *C04B 2111/2038* (2013.01); *C04B 2111/28* (2013.01); *C04B 2111/52* (2013.01)

(58) Field of Classification Search
CPC .. C04B 7/02; C04B 7/34; C04B 18/24; C04B 18/021; C04B 18/241; C04B 22/064; C04B 22/143; C04B 28/02; C04B 28/14; C04B 2111/28; C04B 2111/52; C04B 2111/2038; B28B 1/04; B28B 1/50; B28B 1/525; B28B 13/022; B28C 5/402; B28C 5/404; B28C 7/0007; Y02W 30/91
See application file for complete search history.

(56) References Cited

FOREIGN PATENT DOCUMENTS

| KR | 101437064 B1 | 9/2014 | |
|---|---|---|---|
| MX | 06000036 A | 8/2007 | |
| WO | WO-9718173 A1 * | 5/1997 | ........... C04B 18/241 |
| WO | 2005/054151 A1 | 6/2005 | |

* cited by examiner

*Primary Examiner* — Anthony J Green
(74) *Attorney, Agent, or Firm* — Paul & Paul

(57) ABSTRACT

The present invention is related to materials of construction in the technical field of architecture and civil engineering, known as construction material for masonry; specifically, it is a compound made with a mixture of biodegradable cellulose matrix which is obtained from recyclable materials through an innovative method. Such compound, reaches higher resistance to compression in comparison to the known quality standards, even thought the resultant clusters, blocks or bricks, etc., are lighter due to their high cellulose content. This compound might be used, but not limited to, as raw material to produce hollow bricks, blocks, clusters and other conglomerates to build houses and buildings.

7 Claims, 3 Drawing Sheets

MASONRY CONSTRUCTION MATERIAL WITH A CELLULOSE MATRIX AND METHOD FOR OBTAINING SAME

CROSS-REFERENCE TO RELATED APPLICATION

This application is a 371 national stage application of International Application PCT/CL2019/050050, filed Jun. 20, 2019, and claims the priority of Peruvian Application No. 00174-2018-DIN, filed on Jun. 20, 2018.

SUMMARY

A method to obtain a construction material for masonry with cellulose matrix, characterized because comprehends the following steps: Crushing the pulp of paper (cellulose) until getting particle sizes able to go through mesh No. 04 (holes of 4.75 mm). Weigh and mix the following components until creating a uniform mixture: 58%-62% of pulp of paper (cellulose) previously crushed, 10%-14% of lime, 10%-14% of cement and 13%-17% of water. Let the resultant product air or oven dry to eliminate the humidity, to obtain an artificial aggregate made with pulp of paper (cellulose). Sieve the artificial aggregate with of pulp of paper (cellulose) until getting a fineness module between 4.34-4.54 distributed as follow: 100% able to go through mesh ½" (holes of 12.5 mm), 95%-100% able to go through mesh ⅜" (holes of 9.5 mm), 60%-82% able to go through mesh No. 4 (holes of 4.75 mm), 16%-30% able to go through mesh No. 10 (holes of 2.0 mm), 13%-19% able to go through mesh No. 40 (holes of 0.425 mm), and 11%-17% able to go through mesh No. 200 (holes of 0.075 mm). Weigh and mix the following components until getting a homogeneous mixture: 53%-57% of the artificial aggregate with pulp of paper (cellulose) previously sieved in the anterior procedure, 12%-16% of cement, 12%-16% of lime, 8%-14% of water and 4.5%-6.5% of plaster powder. After the components are mixed to obtain a uniform paste it is compacted in molds, through layers tampering and lateral taps. Finally, after the process of lateral tapping of the mold the brick or block is air dry for 28 days, maintaining a constant humidity content the first 7 days through a curing process.

INVENTION BACKGROUND

In the following lines, a comparison is made between the technique of the common/standard construction materials, and the construction material for masonry with biodegradable cellulose matrix.

As known for the document KR101437064, a concrete panel exposed to a curing autoclave and to a method for manufacturing it, it includes the method to obtain it: make a first mixture, mixing a part of cement, a part of silica (silicon dioxide, $SiO_2$) flour, a part of silica sand, and a part of cellulose fiber, a part of plaster powder, a part of lime (calcium oxide, $CaO$) and water. Then make a second mixture using the first mixture obtained and adding Aluminum oxide ($Al_2O_3$) and water. Let the second mixture air dry in a mold. Then curing and drying the object extracted from the mold in an autoclave. According to this invention, the resultant panel is elegant and easy to paint, it has an excellent resistance to outdoor climate changes and to water, and the method used for manufacturing minimize the defects of construction because it doesn't produce deformation.

This procedure of mix in its modality to manufacture bricks and blocks contains a weigh of 3.5% of cellulose fiber and 70-74% of cemental materials like (cement, fine silica powder, silica fiber, silica sand and lime). It also presents resistance to a low compression, in the range of 40-55 $kp/cm^2$ or 4.0-5.6 $kg/cm^2$; in relationship to its high specific weight, between 1400-1500 $kg/m^3$; giving as a result a wall, with heavy elements and low resistance to compression, which limits the height of walls of not confined masonry to a maximum of 2.5-3.0 meters.

It is also known the document MXNL06000036, described as a compound with base of cellulose fiber of natural origin, that has a biodegradable matrix and light cemental materials like lime, cement, plaster powder and magnesium hydroxide, which can be used as thermal isolation or as raw material in the production of bricks, breeze blocks, panels, drawers and boards or agglomerates for the construction of houses and buildings. The material has isolating and acoustic properties, is not corrosive, reactive, toxic, flammable or infectious. To make the mixture of such material, it is mixed cellulose fiber with sawdust, storing it so it does not loose humidity; then other cemental materials as follow are added to it: plaster powder, magnesium hydroxide, cement, lime, and water. The purpose of such compound is providing biodegradable and renewable materials that can have a reduced impact in the environment in terms of construction. Also, this material maintains the characteristics of mechanical resistance of the standard materials.

This procedure of mixture and its corresponding modality to obtain it is used for the manufacturing of bricks or blocks with a weight of 21.6% of cellulose fiber and 57% of cemental materials like plaster powder, cement, lime and magnesium hydroxide. It also presents resistance to a low compression in the range of 25-35 $kp/cm^2$ or 2.55-3.57 $kg/cm^2$; in relationship to its high specific weight, between 1200-1300 $kg/m^3$; giving as result a heavy wall with elements that present low resistance to compression, which limits the maximum high of not confined masonry walls to 2.5-3.0 meters.

In conclusion, according to the techniques explained above, the compounds with a biodegradable matrix of cellulose present resistance to a low compression, in the envelope range between 25-55 $kp/cm^2$ or 2.55-5.6 $kg/cm^2$; in relationship to its specific weight, in the envelope range between 1200-1500/$m^3$. It is also observed, in the results of this research:

that while the proportion of cemental materials are diminished and the proportion of cellulose is increased, the specific weight of the final product decreased, but the resistance to compression also decreased, this is because a deficient method of manufacturing of the elements of construction as bricks and blocks, the inadequate use of the cemental materials and the poor use in the percentage in weight of the fiber/pulp of cellulose.

DESCRIPTION OF THE INVENTION

This invention has been thought as a solution that contribute to the need of having a compound with biodegradable cellulose matrix obtained through a recyclable process which permits manufacturing construction materials for masonry with high resistance to compression and a low specific weight.

The components of the invention are: cellulose pulp, lime, cement, plaster powder and water.

The cellulose pulp may be obtained from natural sources or through the recyclable process of paper; contributing, even more, to the environment conservation, this invention is then a material of sustainable development.

The procedure to obtain the compound to make bricks or blocks comprehends the following steps:

1. Crushing the cellulose pulp until getting particle sizes able to go through the sieve No. 04 (holes of 4.75 mm).
2. Weigh and mix the following components until creating a uniform mixture: 58%-62% of the cellulose pulp previously crushed, 10%-14% of lime, 10%-14% of cement and 13%-17% of water.
3. Let the resultant product from step 2 air or oven dry to eliminate the humidity, to obtain an artificial aggregate made with cellulose pulp.
4. Sieve the artificial aggregate of cellulose pulp until getting a fineness module between 4.34-4.54 distributed as follow: 100% able to go through mesh ½" (holes of 12.5 mm), 95%-100% able to go through mesh ⅜" (holes of 9.5 mm), 60%-82% able to go through mesh No. 4 (holes of 4.75 mm), 16%-30% able to go through mesh No. 10 (holes of 2.0 mm), 13%-19% able to go through mesh No. 40 (holes of 0.425 mm), and 11%-17% able to go through mesh No. 200 (holes of 0.075 mm).
5. Weigh and mix the following components until getting a homogeneous mixture: 53%-57% of the artificial aggregate made with cellulose pulp previously sieved in step 4, 12%-16% of cement, 12%-16% of lime, 8%-14% of water and 4.5%-6.5% of plaster powder.
6. Compaction in molds of the resultant paste from step 5, tamped in layers and lateral taps.
7. Let the brick or block in the mold air dry for 28 days, maintaining a constant humidity content the first 7 days through the curing process.

The molds used in the process must be previously greased or waxed in order to easily removed the final product from them when the compound gets dry and hard.

The tamping process described in the step No. 6, is done by layers of up 10 cm of height through 25 taps with a compaction bar, distributed in its surface every 100 cm$^2$.

The lateral taps process described in the step No. 6, is done by applying 8 taps with a rubber hammer for each tamped layer; which must be distributed uniformly in the lateral sides of the mold.

The second object of protection is construction material for masonry with cellulose matrix product of the procedure previously described in the above steps, which comprehends in weigh 31%-35% of cellulose pulp, 19%-23% of lime, 19%-23% of cement, 4%-8% of plaster powder, and 17%-22% of water.

Among the most highlighting properties of the final product obtained of the above process we can indicate that it has a resistance to compression between 70-75 kp/cm$^2$ or 7.15-7.65 kg/cm$^2$, which will be detailed according to tests in the preferent modality of realization; which is superior to the stablished Norm COVENIN 42-82 for concrete blocks, that stablishes a minimum resistance of 25 klp/cm$^2$ per unit, or Norm COVENIN 2-78 for clay blocks for walls, or the Peruvian Technical Norm of Construction E.080, whose admissible value stablishes 2 kg/cm$^2$.

Because of these reasons this construction material for masonry with biodegradable cellulose matrix beats the similar inventions mentioned in the invention background in relationship to the resistance and compression properties.

The inventive level of this invention is demonstrated when even though the proportion of cemental materials as lime, plaster powder, lime and cement (46%-48%) are decreased, and the proportion of cellulose pulp is increased (31%-35%); the resistance to compression of the final product obtained through the previously described procedure, is maintained and it is even greater than the similar inventions mentioned in the invention background beating the requirements of the different technical norms for construction elements to be used for masonry.

Also, the increment of the proportion of cellulose pulp make that the invented product can have less specific weigh, making the walls built with it lighter, environmentally friendly and it only requires confinement up to 3.5-4.0 meters of height.

This is possible because in the second step of the procedure described above, is created an artificial aggregate with cellulose pulp, where the crushed matrix of cellulose is surrounded and soaked in cemental materials that get dry and hard forming an intermediate granular product similar to fine sand, but more homogeneous, harder and with biodegradable matrix.

Such artificial aggregate previously sieved according to a defined and determined studied granulometry is the main component of the construction elements to be used for masonry like bricks and hollow blocks.

The cost to elaborate the invented compound is very low, inclusive lower than the cost of the similar inventions previously mentioned in the invention background, because the raw material used is the cellulose pulp which can be obtained for a low cost or from recyclable materials.

DESCRIPTION OF THE PREFERENT MODE OF THE INVENTION

Figure 1:
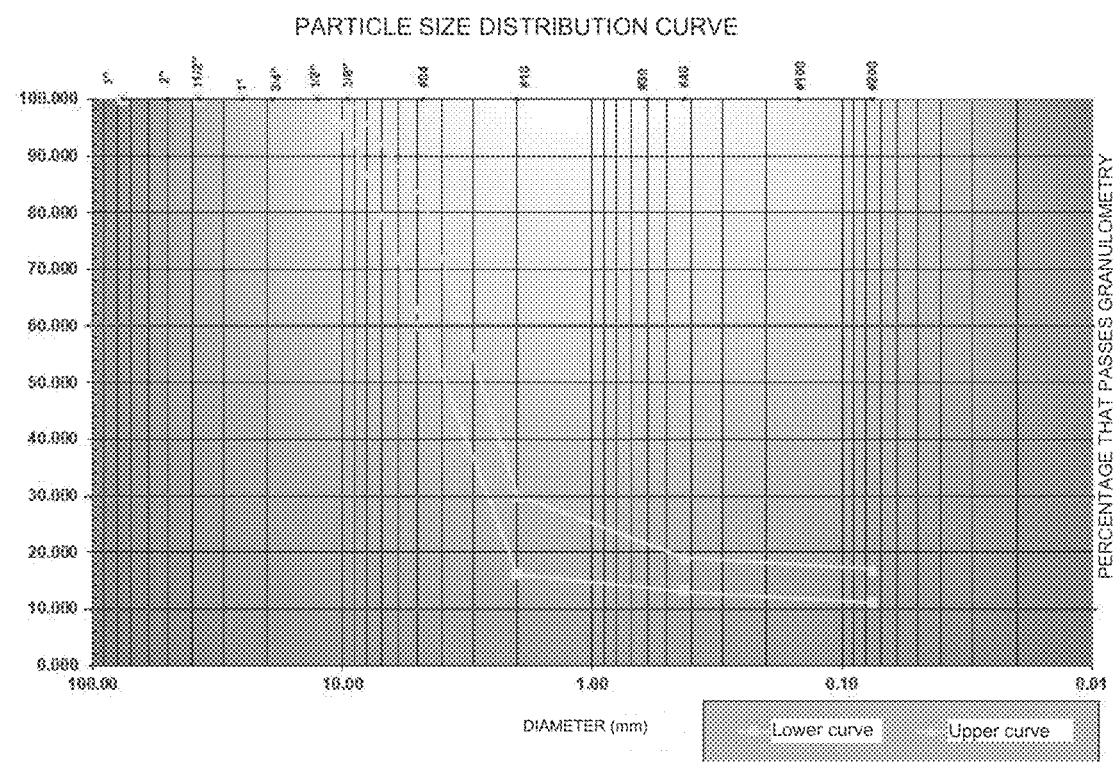
FIG. 1: It shows a curve of granulometry distribution with the maximum and minimum limits resulting from step 4 of the procedure object of this invention, which is explained in written form in the description of this invention.
Figure 2:
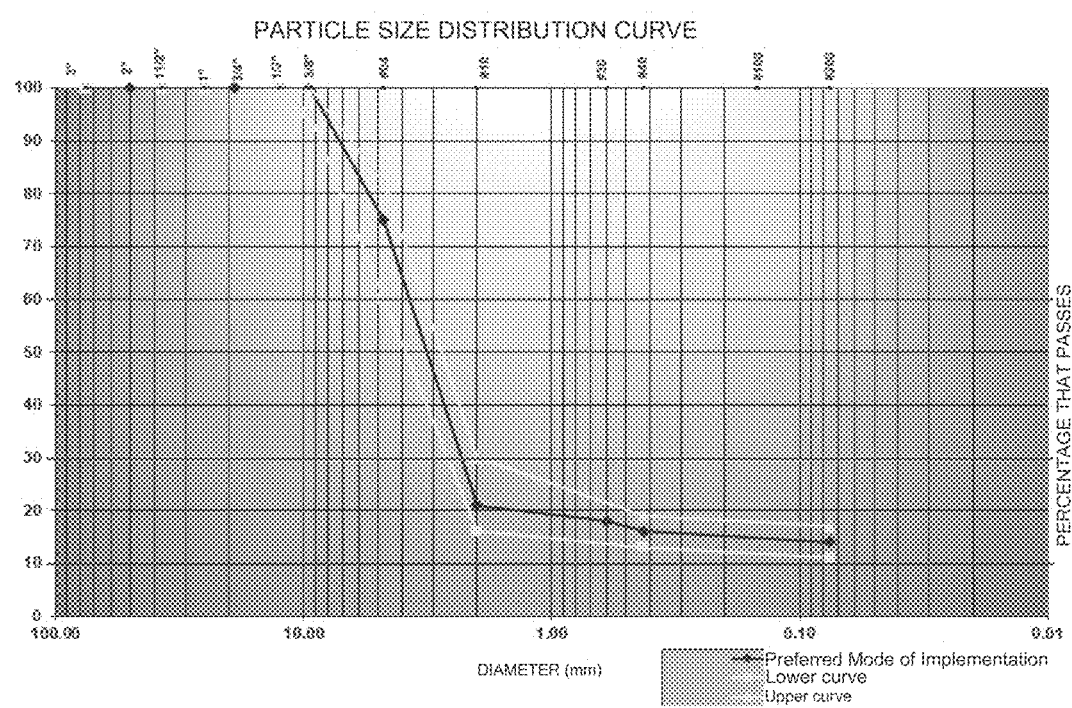
FIG. 2: It shows a curve of granulometry distribution with the maximum and minimum limits resulting from step 4 of the procedure object of this invention, which is explained in written form in the description of this invention, adding the granulometry distribution used in the realization of the preferent modality.
Figure 3:
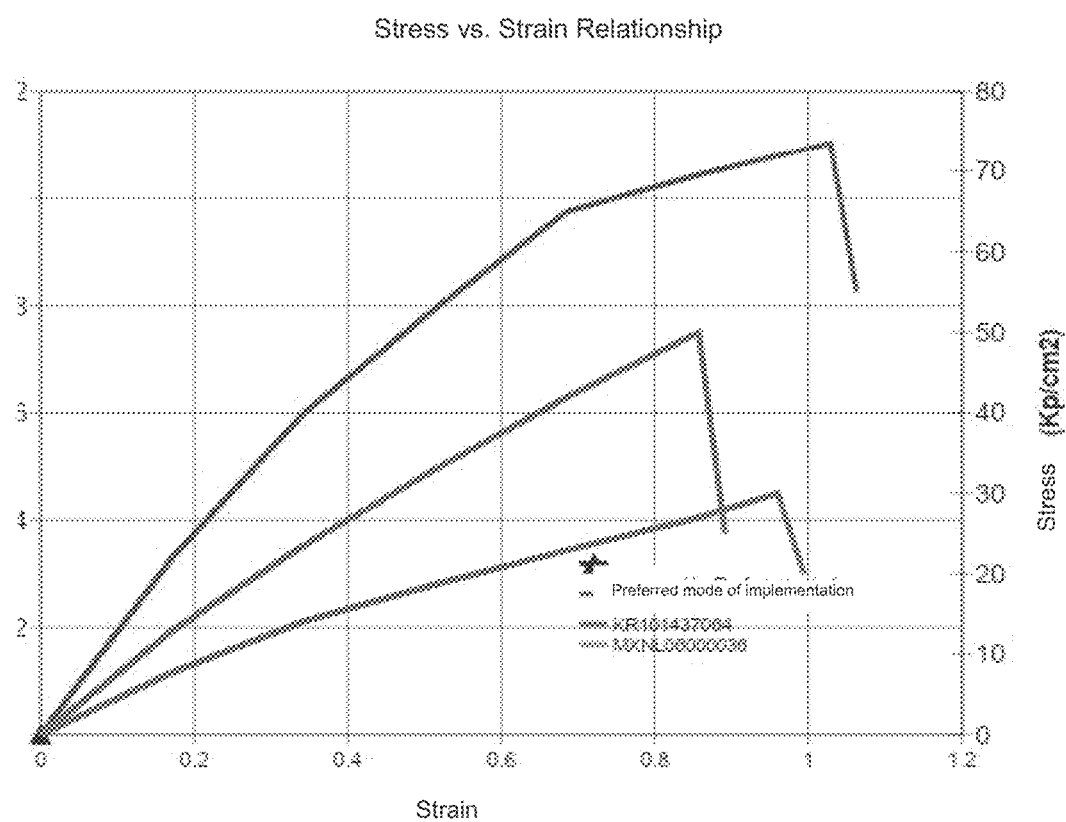
FIG. 3: It shows the effort curve-deformation, product of the laboratory results of the broken test pieces between the preferent modality and the closest background.

The procedure to obtain a construction material for masonry with matrix of cellulose pulp, has as the best-known method to do the invention as follow:

1. Crushing the cellulose pulp until getting particle sizes able to go through mesh No. 04 (holes of 4.75 mm).
2. Weigh and mix the following components until creating a homogeneous mixture: 100 kg of pulp of cellulose previously crushed, 20 kg of lime, 20 kg of cement and 25 liters of water.
3. Let the resultant product air or oven dry to eliminate the humidity, to obtain an artificial aggregate made with cellulose pulp.
4. Sieve the artificial aggregate made with pulp of paper (cellulose) until getting a fineness module between 4.34-4.54 distributed as follow: 100% able to go through mesh ½" (holes of 12.5 mm), 100% able to go through mesh ⅜" (holes of 9.5 mm), 75% able to go through mesh No. 4 (holes of 4.75 mm), 21% able to go through mesh No. 10 (holes of 2.0 mm), 16% able to go through mesh No. 40 (holes of 0.425 mm), and 14% able to go through mesh No. 200 (holes of 0.075 mm).
5. Weigh and mix the following components until getting a homogeneous mixture: 100 kg of the artificial aggregate previously sieved in step 4, 25 kg of cement, 25 kg of lime, 15 liters of water, and 10 kg of plaster powder.
6. Compaction of the resultant paste from step 5 in molds, tamped in layers and lateral taps.
7. Let the brick or block in the mold air dry for 28 days, maintaining a constant humidity content the first 7 days through the curing process.

The molds used in the process must be previously greased or waxed in order to easily removed the final product from them when the compound gets dry and hard.

The tamping process described in the step No. 6, is done by layers of up 10 cm of height through 25 taps with a compaction bar distributed in its surface every 100 cm2.

The lateral taps described in the step No. 6 previously described, is done by applying 6-10 taps with a rubber hammer for each tamped layer; which must be distributed uniformly in the lateral sides of the mold.

Therefore, the construction material for masonry with matrix of cellulose as the resultant product of the procedure described above has a weight of 33% of cellulose pulp, 20.6% of lime, 20.6% of cement, 6% of plaster powder and 19.8% of water.

The tests done in the Laboratory of Materials of the School of Engineering of the University of Carabobo-Venezuela indicate that the block, resulting from the procedure of this invention described above, molded with dimensions according to the COVENIN Norm 42-82 for hollow blocks of concrete has a resistance to compression of 73.52 $kp/cm^2$, being able to resist a maximum load of 3.95 tons before it breaks; which is superior to the stablished in the COVENIN Norm 42-82 for blocks of concrete, which stablishes a minimum resistance of 25 klp/cm² per unit, or the COVENIN Norm 2-78 for clay blocks for walls, or the Peruvian Technical Standard of construction E.080, whose admissible value stablishes 2 $kg/cm^2$.

Because of these reasons, this construction material for masonry with biodegradable cellulose matrix beats the similar inventions mentioned in the invention background in relationship to their resistance and compression properties.

The inventive level of this invention is demonstrated when even though the proportion of cemental materials as lime, plaster powder, and cement (47.2%) is decreased, and the proportion of cellulose pulp is increased (33%); the resistance to compression of the final product obtained through the previously described procedure, is maintained and it is even greater than the similar inventions beating the requirements of the different technical norms for construction elements to be used for masonry.

Also, the increment of the proportion of cellulose pulp make that the invented product can have less specific weigh, making the masonry walls built with it lighter, environmentally friendly and it does not require confinement, but up to 3.5-4.0 meters of height.

This is possible because in the second step of the procedure described above, is created an artificial aggregate with cellulose pulp, where the crushed matrix of cellulose is surrounded and soaked in cemental materials that get dry and hard; forming an intermediate granular product similar to fine sand, but more homogeneous, harder and with biodegradable matrix. Such artificial aggregate previously sieved according to a defined and determined researched granulometry is the main component of the construction elements to be used for masonry like bricks and hollow blocks.

The cost to elaborate the invented compound is very low, inclusive lower than the cost of the similar inventions mentioned in the invention background, because the raw material used is the cellulose pulp which can be obtained for a low cost or from recyclable materials.

What is claimed is:
1. A method for obtaining a construction material having a cellulose matrix, the method comprising:
   a. crushing cellulose pulp to provide particle sizes able to pass a No. 4 sieve (holes of 4.75 mm) to provide crushed pulp;
   b. mixing 58%-62% crushed pulp, 10%-14% lime, 10%-14% cement and 13%-17% water, to create a uniform mixture;
   c. drying the uniform mixture to obtain an artificial aggregate;
   d. sieving the artificial aggregate to provide a Fineness Modulus between 4.34-4.54 distributed as follow: 100% able to pass through mesh ½" (holes of 12.5 mm), 95%-100% able to pass through mesh ⅜" (holes of 9.5 mm), 60%-82% able to pass through mesh No. 4 (holes of 4.75 mm), 16%-30% able to pass through mesh No. 10 (holes of 2.0 mm), 13%-19% able to pass through mesh No. 40 (holes of 0.425 mm), and 11%-17% able to pass through mesh No. 200 (holes of 0.075 mm); to provide a sieved artificial aggregate;
   e. mixing 53%-57% sieved artificial aggregate, 12%-16% cement, 12%-16% lime, 8%-14% water and 4.5%-6.5% plaster powder until a homogeneous mixture is obtained, to provide the construction material.
2. The method according to claim 1 further comprising compacting the uniform mixture in a mold having sides and an open top, the compacting including tamping down layers of the uniform mixture and tapping the sides of the mold, to provide a compacted uniform mixture.
3. The method according to claim 2 wherein the layers are of up to 10 cm in height, and the tamping is accomplished with a compacting bar using 25 tamps for each layer, the tamping being uniformly distributed over each 100 $cm^2$ of the surface of the uniform mixture.
4. The method according to claim 3 wherein 6-10 taps are applied with a rubber hammer for each tamped layer, the taps being distributed uniformly on the sides of the mold.
5. The method according to claim 4 wherein the compacted uniform mixture is air dried for 28 days, maintaining a constant humidity content the first seven days, to provide a cured, dried construction material.
6. The method according to claim 2 wherein the mold is greased or waxed in order to permit easy removal of the mold.
7. A construction material prepared according to the process of claim 1.

* * * * *